(12) United States Patent
Klicpera (10) Patent No.: US 10,489,038 B2
(45) Date of Patent: Nov. 26, 2019

(54) REMOTE APPARATUS FOR DISPLAYING, MONITORING AND CONTROLLING SHOWER, BATH OR FAUCET WATER PARAMETERS

(71) Applicant: Michael Edward Klicpera, San Diego, CA (US)

(72) Inventor: Michael Edward Klicpera, San Diego, CA (US)

( * ) Notice: Subject to any disclaimer, the term of this patent is extended or adjusted under 35 U.S.C. 154(b) by 109 days.

(21) Appl. No.: 15/163,968

(22) Filed: May 25, 2016

(65) Prior Publication Data

US 2016/0378322 A1  Dec. 29, 2016

Related U.S. Application Data

(63) Continuation-in-part of application No. 12/986,341, filed on Jan. 8, 2011, now abandoned.

(60) Provisional application No. 62/166,067, filed on May 25, 2015.

(51) Int. Cl.
| | | |
|---|---|---|
| *G06F 3/0484* | (2013.01) | |
| *G06F 3/0362* | (2013.01) | |
| *G06F 3/0482* | (2013.01) | |
| *G06F 3/0481* | (2013.01) | |
| *G06F 3/0488* | (2013.01) | |
| *E03B 7/07* | (2006.01) | |

(52) U.S. Cl.
CPC ........ *G06F 3/04847* (2013.01); *G06F 3/0362* (2013.01); *G06F 3/0482* (2013.01); *G06F 3/04817* (2013.01); *G06F 3/04886* (2013.01); *E03B 7/07* (2013.01)

(58) Field of Classification Search
None
See application file for complete search history.

(56) References Cited

U.S. PATENT DOCUMENTS

| | | |
|---|---|---|
| 5,782,296 A | 7/1998 | Vinay |
| 7,744,008 B2 | 6/2010 | Chapman |
| 7,801,646 B2 | 9/2010 | Amundson |
| 8,554,374 B2 | 10/2013 | Lunacek |

(Continued)

OTHER PUBLICATIONS

Moen Corporation, U Shower (https://www.moen.com/whats-new/innovation/u).

(Continued)

*Primary Examiner* — Lauren A Crane
(74) *Attorney, Agent, or Firm* — Michael Edward Klicpera (57) ABSTRACT

The present invention is a remote display that communicated with a water parameter sensors engage to or in close proximity to a water supply piping or incorporated within a shower, or bath or faucet head, in an aesthetically pleasing format. The remote water parameter sensors includes power source, microprocessor and/or microcontroller, temperature sensor and/or water flow sensors, timing circuits. The remote display apparatus can communicated with the water parameter sensors by wired or means. The remote display apparatus can be a substantially round housing encircled with an interface ring having a centrally located display, or can be a square, rectangle, circle or other configuration touch-screen display mounted on a housing that has soft button for menu derived operations. Both embodiments have a back portion designed to adhere to various surfaces.

18 Claims, 1 Drawing Sheet

(56) References Cited

U.S. PATENT DOCUMENTS

| | | | |
|---|---|---|---|
| 8,620,841 B1 | 12/2013 | Filson | |
| 8,706,270 B2 | 4/2014 | Fadell | |
| 9,085,881 B2 | 7/2015 | Hanna | |
| 9,085,882 B2 | 7/2015 | Hanna | |
| 9,286,781 B2 | 3/2016 | Filson | |
| 9,489,062 B2 | 11/2016 | Corcoran | |
| 9,777,470 B2 | 10/2017 | Mazz | |
| 9,804,610 B2 | 10/2017 | Sloo | |
| 2007/0152074 A1* | 7/2007 | Stowe | E03C 1/055 236/12.1 |
| 2016/0258144 A1 | 8/2016 | Tayenaka | |
| 2017/0350102 A1 | 12/2017 | Lee | |
| 2017/0364103 A1 | 12/2017 | Herrera | |
| 2018/0094413 A1 | 4/2018 | Chaky | |
| 2018/0298596 A1 | 10/2018 | Tsai | |
| 2019/0024350 A1 | 1/2019 | Silverstein | |

OTHER PUBLICATIONS

Kohler Corporation ,DTV+ Shower System (https://www.us.kohler.com/us/smarthome/content/smarthome.htm#dtv).

* cited by examiner

REMOTE APPARATUS FOR DISPLAYING, MONITORING AND CONTROLLING SHOWER, BATH OR FAUCET WATER PARAMETERS

RELATED APPLICATIONS

This application is a continuation application Ser. No. 11/877,860 filed on Oct. 24, 2007, Ser. No. 12/539,150 filed on Aug. 11, 2009, Ser. No. 12/986,341 filed on Jan. 7, 2010, Ser. No. 12/877,094 filed on Sep. 7, 2010, and Ser. No. 14/693,394 files on Apr. 22, 2015.

FIELD OF THE INVENTION

This patent specification relates to systems, methods, and related computer program products for the monitoring and control of water parameter systems or other water resource-consuming systems. More particularly, this patent specification relates to user interfaces for display and/or control units that govern the operation of water-consuming systems, household or commercial showers, toilets, faucets, and other water resource-consuming systems, including user interfaces with the water parameter controller using wired or wireless communication.

BACKGROUND OF THE INVENTION

Conventional shower head designs include those having a shower head housing with a plurality of passageways allowing various water sprays to flow from the shower head. Furthermore, shower heads having a surface with a plurality of passageways, or nozzle orifices which utilize a backing disk having a plurality of resilient and flexible nozzle tips protruding through the nozzle orifices are known. The resilient nozzles of these known shower heads allow for convenient elimination of the build-up of calcium or other deposits by manually flexing the resilient nozzles when it appears that material is collecting therein. In these known shower heads, the entire nozzle is formed of a resilient and flexible rubber which does not match the finish of, e.g., a brass or chrome shower head.

The use of adjustable shower heads is known in the prior art. More specifically, adjustable shower heads heretofore devised and utilized are known to consist basically of familiar, expected and obvious structural configurations, notwithstanding the myriad of designs encompassed by the crowded prior art which have been developed for the fulfillment of countless objectives and requirements.

Conventional faucets are available in various designs for kitchens, bathrooms, baths, corporate faucets and water systems. The faucets can be a rigid or flexible design and generally is fitted with an aerator at the terminal water discharge port.

Water conservation is becoming a major issue for many cities and an apparatus for monitoring water usage at a specific residential, governmental or corporate sites could be useful in supporting water conservation.

One type of an adjustable shower head or faucet includes water supply piping assemblies that are conventionally constituted by a hose which may be in the form of a flexible tube protected by metal coils or in the form of a plastic hose optionally including braiding. In either case, the hose is generally linear in shape and has a length lying in the range 1.25 meters (m) to 2 m. When not in use, the hose hangs down into a bath tub or other bathroom fitting where it is often dirtied by contact with dirty water.

Sometimes the hose can be hidden away in a chute (requiring a hole to be made), in which case it dirties a volume that is inaccessible for cleaning. The hole often leads to water seeping under the bath tub. Furthermore, these drawbacks (difficulty of storage and problems with dirt) make it undesirable to install a longer hose, even though a longer hose would often be convenient when the shower head is in use. As a result of shower hoses not being long enough, they are often damaged by the user pulling on them.

Anti-scalding pressure balance and thermostatic temperature control valves are becoming an important part in bathroom plumbing because the attempt to minimize scalding and cold water shocks that can occur in a shower when a toilet is flushed or a faucet is turned on.

Accordingly, a need remains for an remote apparatus with one or more displays either with analog or digital means certain parameters, such as total shower time, flow rate, total volume, and temperature.

In additional, this is a need for an adjustable shower or bath head or water supply piping monitors water usage to encourage water savings and promote careful conscientious use of water and energy resources. In the shower or faucet embodiment, the present invention satisfies such a need by providing a remote display and controlling apparatus that is convenient and easy to use, provides adequate reach and adjusting capabilities for various applications, and is attractive in appearance.

Controllers are used on a wide variety of devices and systems for controlling various functions in homes and/or buildings and their related grounds. Some controllers have schedule programming that modifies device parameter set points as a function of date and/or time. Water parameter controllers, for example, are employed to monitor and, if necessary, control various conditions within a home, office, or building. Such devices are useful, for example, in regulating any number of water sources including for example, temperature, flow rate, cumulative time water is flowing, calibration methods, programming features, etc. The remotely located water parameter display and controlling apparatus may include a microprocessor that interacts with other components in the system wired or wireless technology. The remote display apparatus (user interface module) is designed to have remote communication with temperature sensors, water flow sensors, and timing circuits that are in close proximity to a water supply (water parameter collector unit). For example, a sensor located remotely from the user interface module and/or at one or more remote locations may be employed to sense when the temperature reaches a certain threshold level, displays cumulative time and flow parameters, causing the controller unit to send a signal (e.g. cell phone, smart phone, or similar apparatus) to activate or deactivate one or more components in the system.

The remote water parameter display and control apparatus may be equipped with an interface that allows the user to program and adjust the water parameter sensors at one or more locations within the building. With more modem designs, the interface typically includes a liquid crystal display (LCD, LED, OLED) panel inset within a housing that contains the microprocessor as well as other components of the controller. In some designs, the interface may permit the user to program the controller to modify certain functions or display, or activate on a certain schedule determined by the user. For example, the interface may include a separate menu routine that permits the user to control the time a water source is on or allow access at one or more times during a particular day. Once the settings for that day have been programmed, the user can then repeat the process to change the settings for the other remaining days.

The remote display apparatus (user interface module) may have one or more push buttons located in close proximity to the controller or utilize soft buttons that are programmed to be utilized with a touch screen display, or a rotating outer mechanism can be used to assist selected certain soft buttons to perform program instructions, change settings, or input passwords. A microcontroller or the like typically receives and interprets the signals from the push buttons and implements the desired function. It has been found, however, that some users have difficulty controlling and/or programming their controllers using such pushbuttons, particularly those users that are not familiar with modem computers and/or computer interfaces. Programming or settings activators can be used to modify a shower on/off period, modify displayed parameters order or selection, color schemes, Bluetooth, Zigbee or WIFI settings, calibrate the temperature, water flow and timing sensors, temperature over-set point, time sent-point, flow rate set-point, detect broken sensors, define a shower hold-out period, modify the display of parameters, or input passwords.

The display means must be able to provide sufficient lighting in shower conditions. In addition, the display means must be able to sustain capability in moist wet conditions.

SUMMARY OF THE INVENTION

The present invention is a remote water parameter display and control apparatus with various attachment means for affixation to multiple types of surfaces, e.g. glass, walls, or covered walls or joists and posts. The remote water parameter display (user interface module) is designed to remotely communication with temperature sensors, water flow sensors, timing circuits and a water control valve that are in close proximity to a water supply (water parameter collector unit). The remote water parameter display and control apparatus can include a microprocessor and/or microcontroller, electrical circuitry with wired or wireless technology. The remote water parameter display and control apparatus comprises two embodiments a first with a substantially circular base have a central display means and an user interface ring surrounding the central area and a second embodiment comprising a touch-screen display with soft buttons that can be shaped in multiple configurations. Both embodiments utilize a series or menus and submenus that access various programmable features that are accessed by the user interface ring with central display or soft buttons. The remote water parameter display and control apparatus can be an analog or digital display or combination of analog, graphic and/or digital display means. Ergonomically placed buttons can be incorporated into the remote water parameter display and control apparatus housing, or a soft buttons can be programmed to be utilized with a touch screen display, or a rotating outer mechanism can be used to assist selected certain soft buttons to perform program instructions, change settings, or input passwords. Programming or settings activators can be used to modify a shower, bath or faucet on/off period, modify displayed parameters order or selection, color schemes, Bluetooth, WIFI settings, calibrate with the temperature, water flow and timing sensors, define a hold-out period, modify the display of parameters, or input passwords. The display means must be able to provide sufficient lighting in shower conditions. In addition, the display means must be able to sustain capability in moist wet conditions.

BRIEF DESCRIPTION OF THE DRAWINGS

Corresponding reference characters indicate corresponding parts throughout the several views. The exemplifications set out herein illustrate exemplary embodiments of the invention, and such exemplifications are not to be construed as limiting the scope of the invention in any manner.

DESCRIPTION OF THE PREFERRED EMBODIMENTS

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

As used herein, the term "remote water parameter display and control apparatus" include a user interface (display) module and a remotely located water parameter collector unit. The entire combined apparatus will also be referred to as the RWPDMC. The user interface module communicates through wire or wireless technology with water parameter sensors in close proximity water supply. The are menu options for modifying the parameter or settings include, for example, modify a shower on/off period, modify displayed parameters order or selection, color schemes, Bluetooth, WIFI settings, calibrate with the temperature, water flow and timing sensors, define a hold-out period, modify the display of parameters, or input passwords and/or the like.

The subject matter of this patent specification relates to the subject matter of the following commonly assigned applications, each of which is incorporated by reference herein: Ser. No. 11/877,860 filed on Oct. 24, 2007, Ser. No. 12/539,150 filed on Aug. 11, 2009, Ser. No. 12/986,341 filed on Jan. 7, 2010, Ser. No. 12/877,094 filed on Sep. 7, 2010, Ser. No. 12/986,341 filed on Jan. 7, 2010, Ser. No. 13/216,521 filed on Aug. 24, 2011, Ser. No. 13/217,497 filed on Aug. 24, 2011, Ser. No. 13/491,201 filed on Jun. 6, 2012, Ser. No. 13/541,819 filed on Jul. 5, 2012, Ser. No. 13/776,963 file on Feb. 26, 2013, Ser. No. 14/561,217 filed on Dec. 5, 2014, Ser. No. 14/596,460 filed on Jan. 1, 2015 and Ser. No. 14/693,394 files on Apr. 22, 2015. The above-referenced patent applications are collectively referenced herein as "the commonly assigned incorporated applications."

The RWPDMC comprising a remotely located user interface module and a water parameter collector unit. The user interface module is either a outer ring with inner round electronic display window design or a square or rectangle housing with an electronic window with activators/push buttons or push screen technology. The water parameter collector unit has at least one of a water flow sensor, a water flow indicator, a temperature sensor that are in close proximity to a water supply and a control valve coupled to the water supply. The at least one water flow sensor and water flow indicator can provide water duration information for a timing circuit.

In the first embodiment, the RWPDMC has display, monitoring and control functionality and includes characteristics other than displaying and monitoring time, temperature and water flow (e.g., passwords, language, alarms, acoustic loudness, display brightness, sensor calibration, etc.) for any of a variety of different water conservation systems. Each RWPDMC includes a user-interface component, such as a rotatable ring. Using the ring, a user can easily navigate through and select between selection menu driven options (e.g., to set an alarm or identify preferences). For example, a user may rotate a ring (e.g., in a clockwise direction) to highlight an icon or soft command based on rotational input. Further, the user may be able to view and/or navigate through a menu system using the ring around the display. For example, a user input (e.g., inwards pressure on the ring) may result in a presentation of a menu or sub-menu on the electronic display. A user may rotate the ring to, e.g., scroll through selection options and select an option by pressing on the ring.

Figure 1:
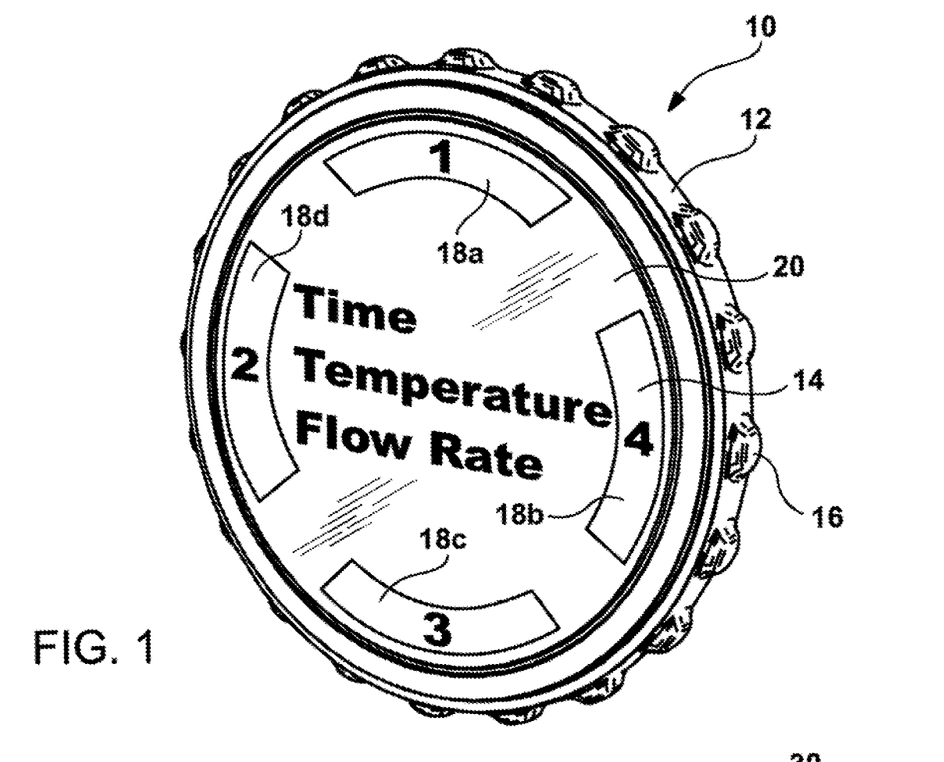
FIG. 1 is a perspective view of the first embodiment comprising an adaptable remote display, monitor and/or control apparatus in a substantially circular configuration and including housing that cooperates with one or more microprocessors/microcontrollers, electrically circuitry, a display, a rotatable ring mechanism and a rear surface attachment means designed to communicate by wired or wireless technology to a remotely located water flow sensor, temperature sensor and timing circuit attached to or in close proximity to a water supply.

FIG. 1 is a perspective view of the first embodiment comprising an adaptable remote display, monitor and/or control apparatus 10 in a substantially circular configuration and including housing that cooperates with one or more microprocessors/microcontrollers, electrically circuitry, a display, a rotatable ring mechanism and a rear surface attachment means designed to communicate by wired or wireless technology to a remotely located water flow sensor, temperature sensor and timing circuit attached to or in close proximity to a water supply.

Figure 2:
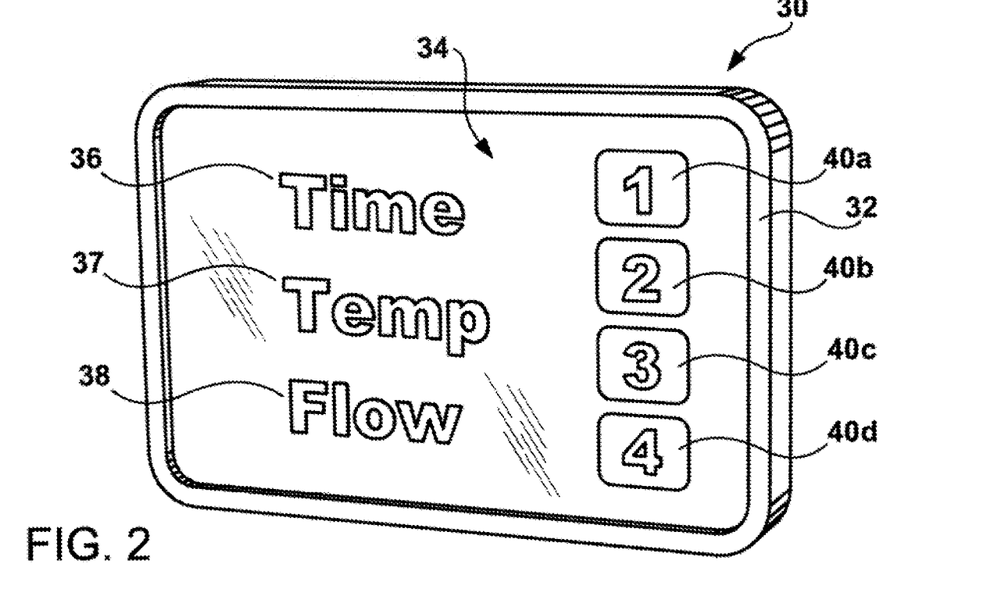
FIG. 2 is a perspective view of the second embodiment comprising an adaptable remote display, monitor and/or control apparatus with a touch-screen display in a round, square, rectangle or other configuration utilizing LED, LCD, OMLED or other display technology and including a housing that cooperates with one or more microprocessors/microcontrollers, housing, rotatable ring mechanisms and rear surface attachment means designed to communicate by wired or wireless technology to a remotely located water flow sensor, temperature sensor and timing circuit attached to or in close proximity to a water supply.

FIG. 2 is a perspective view of the second embodiment comprising an adaptable remote display, monitor and/or control apparatus 30 with a touch-screen display in a round, square, rectangle or other configuration utilizing LED, LCD, OMLED or other display technology and including a housing that cooperates with one or more microprocessors/microcontrollers, housing, rotatable ring mechanisms and rear surface attachment means designed to communicate by wired or wireless technology to a remotely located water flow sensor, temperature sensor and timing circuit attached to or in close proximity to a water supply.

The user interface module of the remote water parameter display, monitor and control (RWPDMC) apparatus 10, 30 also includes a housing designed to be mounted on various surfaces such as glass surface, a wall surface, a mirror surface, wood beam, a metal surface, a plastic surface, a ceramic surface, a tile surface, a panel surface, a wall paper surface. The housing can be fabricated from a metallic material such as brass, brass alloys, steel, galvanized steel, copper, copper allows or any combination thereof. The housing can be fabricated from a number of polymeric materials, such as polyvinyl chloride (PVC), polyethylene, polybutylene, acryaontirile-butadiene-styrene (ABS), rubber modified styrene, polypropylene, polyacetal, polyethylene, or nylon. The base material can be painted white or colored finishes or coated with various brass, silver and gold type materials to an appealing finish.

The selectively layered functionality of the RWPDMC apparatus 10, 30 allows it to be effective for a variety of different technological circumstances in home and business environments, thereby making the same RWPDNC apparatus readily saleable to a wide variety of customers. For simple environments having no wireless home network or internet connectivity, the RWPDMC apparatus 10 operates effectively in a local mode, being capable of directly communicating with the cell phone or custom remote apparatus using Bluetooth, Wi-Fi or Zigbee technology. However, for environments that do have network or internet connectivity, the RWPDMC apparatus 10, 30 can operate effectively in a network-connected mode (with remote computers/servers) to offer a variety of additional capabilities. Network and cellular connectivity may function to communicate water use, temperature and timing parameters, and send command signals to the water parameter collector nun (e.g. turn on and off the shower water) to remote apparatus (e.g. cell phone or smart phone utilizing a specific program (APP) or remote computers using cellular format technology including current and future variants, revisions and generations (e.g. third generation (3G), fourth generation (4G), fifth generation (5G) and all future generations) of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA, Integrated Digital Enhance Network (iDEN), HSPA+, WiMAX, LTE, Flash-OFDM, HIPERMAN, WiFi, IBurst, UMTS, N-CDMA, HSPDA+HSUPA, UMTS-TDD and other formats for utilizing cell phone technology, antenna distributions and/or any combinations thereof, and including the use of satellite, microwave technology, the internet, cell tower, and/or telephone lines. The cellular communication can be sent to a typical cell phone, smart phones, or similar apparatus includes all remote cellular phones using channel access methods defined above (with cellular equipment, public switched telephone network lines, satellite, tower and mesh technology), mobile phones, PDAs, tablets (e.g. refers to all current and future variants, revisions and generations of the Apple IPAD, Samsung Galaxy, HP, Acer, Microsoft, Nook, Google Nexus, Sony, Kindle and all future tablets manufactured by these and other manufactures), Apple IPOD Touch, a smart or internet capable television, wireless timepiece or watch (Apple, Samsung) and other similar apparatus with WIFI and wireless capability, and remote computers/servers and controllers having internet, wireless and/or cell format technology connectivity. The cellular format technology can use Bluetooth or Wi-Fi when within range to communicate with the user interface module or water parameter collector, when extended range, use networks and remote computers (e.g. commercial "cloud" computer companies) to obtain water parameter information, and processes command signals.

It is anticipated by the Applicant that while one or more embodiments is detailed herein is designed to be used in a residential home, such as a family residence, duplexes, townhomes, multi-unit apartments and condominiums, hotels, office buildings, industrial buildings, and any living space or work space having one or more shower systems. Also the terms user, customer, purchaser, installer, and homeowner may often refer to the same person in the case of a family residence, because the head of the household is often the individual that buys the unit, and directs a plumbing professional to install the unit.

Importantly, while the identity of the person performing the action may be important to a particular advantage provided by one or more of the embodiments. For example, the password-protected water use duration control functionality described herein may be particularly advantageous where the landlord holds the sole password and can prevent extensive water waste by the tenant. Such identity should not be construed in the descriptions that follow as necessarily limiting the scope of the present teachings to those particular individuals having those particular identities.

FIG. 1 illustrates a perspective view of a remote water parameter display, monitor and control unit (RWPDMC) apparatus 10. The RWPDMC apparatus 10 preferably has an elegant, visually appealing appearance. The RWPDMC apparatus 10 comprises a main body that is preferably circular in configuration with a diameter in the range of 6-10 cm, and that has a visually pleasing outer finish, such as a satin nickel or chrome finish. Separated from the main body by a small peripheral gap is a rotatable outer ring 12 with engagement facilitation means, a sensor ring 14 and a circular display 20. In the illustrative embodiment, the front surface of the display 20 is shown having a circular shape, however, the front surface 20 can have any useable regular or irregular shape such as, for example, square, rectangle, oblong, or triangular.

The front surface of the user interface module can have a generally planar or non-planar surface. In an illustrative embodiment, the front surface 20 has a generally planar or generally convex surface. In the illustrative embodiment, the front facing electronic display 20, 34 is located generally near the center of the user interface module 10, 30, however, the of the user interface module can be located at any useable visible position on the user interface module 10, 30.

The central display located near the central area 20 (FIG. 1) and 34 FIG. 2) shows at least one of the time or cumulative time 36, the temperature 37 and water flow rate 38 (un-numbered in FIG. 1 and as define in FIG. 2). The display utilizes one or more illuminating technologies, such as LCD, LED, OMLED, gas plasma, fluorescence, incandescent, halogen, halide, or other lighting technologies. The display means and display means housing should be able to sustain exposure to moist wet conditions. The present invention can include one or more than one display parameter. For example, a unit with only the temperature display can be manufactured to reduce overall costs. Furthermore, the orientation of the parameters 36, 37, and 38 presented can be changed, for example, the flow parameter can be on top with the time parameter on the bottom and with the temperature parameter sandwiched between. The displays 20 (FIGS. 1 and 34 FIG. 2) can have a background light that is used for various purposes, for example, for providing better lighting conditions or changing color e.g. from green to red, to display an alarming condition. Displaying of all water parameters 36, 37 and 38 can utilize multiple LCD, LED, OLED, gas plasma, fluorescence, incandescent, halogen, halide, or other lighting technologies separate displays, custom displays, graphic displays or a single line display which sufficient digits that sequences the presentation of the water parameters 36, 37 and 38 one at a time with a specific delay and sequencing. An example of an LCD unit that can be used with the present invention is the color graphic 128×128 LCD-00569 marketed by Sparkfun Electronics in Boulder, Colo. It is anticipated by the Applicants that there are other variants and other LCD, LED, gas plasma, fluorescence, incandescent, halogen, halide, or other lighting technologies that can be utilized with the present invention. In FIGS. 1 and 2, the central display 20, 34 is defined also by a selectable display panels or soft buttons 40a, 40b, 40c and 40d shown along on edge of FIG. 2 and soft buttons or icons 18a, 18b, 18c and 18d located on the periphery as shown in FIG. 1. The selectable display panels or soft buttons 40a, 40b, 40c and 40d or soft buttons or icons 18a, 18b, 18c, 18d can have any useable regular or irregular shape, as desired. It should be recognized that the surface area of the selectable display panel or soft buttons 40a, 40b, 40c and 40d or soft buttons or icons 18a, 18b, 18c and 18d can have any desired size, shape or format arrangement. In addition, it anticipated by the Applicant that the display panels can be one, two, three, four, five, six or more and each selectable display panels or soft buttons that are selectable such that a number of selections are presented on the LCD/LED display, or that subsequent specific menu or submenus are presented on the LCD/LED display. The display 20 can be programmed to exhibit one or more parameters in a visual means that can be either an analog, character or digital display, or combination of display means. Or the time parameter 22, the temperature parameter 24 and the flow rate sensor 26 can be display sequentially once at a time at a given period. Information obtained from the appropriate sensor monitoring or measuring the water parameters such as temperature, shower time (water on), and flow rate can be displayed in an appropriate format on the display means. For example, when a sensor is monitoring the shower temperature of water flowing through the shower head, the display means could show any temperature between 32 degrees Fahrenheit (0 degrees Celsius) and 212 degrees Fahrenheit (100 degrees Celsius), and within a reasonable range of 50 degrees Fahrenheit (10.0 degrees Celsius) and 150 degrees Fahrenheit (65.5 degrees Celsius). For example, when a sensor is monitoring or measuring the rate of water flowing from a water source or through the shower head, the display means could show any flow between 0 gal/min (0 liters/hr) and 100 gal/min, within a reasonable range of 0.2 gal/min (liter/min) to 20 gal/min (liters/min). In additional, when a sensor is monitoring or measuring the rate of water flowing from a water source or through the shower head, the display means could show the total volume of water that has been used, e.g. 23 gallons. Furthermore, the display can be programmed to display calendar information, such as the date and current time (12 hr. or 24 hr. format).

A separate display retainer and switchable backlight disposed behind the display panel may be used to illuminate the central display area 20 and the selectable display panels or soft buttons 18a, 18b, 18c and 18d at times when visibility is compromised e.g. night, and to increase the visibility of the display panel during daytime use. A backlight button may be used to operably activate and/or deactivate the switchable backlight. Alternatively, or in addition, the switchable backlight can be activated by moving the interface member 16 when displaying and/or adjusting a display parameter. The switchable backlight can deactivate following the expiration of a specific time interval.

The backlight can be controlled by a backlight button perimeter or by automatic sensing means. The backlight button (not shown) can have any useable regular or irregular shape, or be a soft button or selectable panel area as desired. The backlight button has a backlight button surface area within the backlight button perimeter. However, it should be recognized that the surface area of the backlight button can have any desired size. In an illustrative embodiment, the backlight button has a surface area that is greater than or equal to the display panel 14 surface area. In some illustrative embodiments, the backlight button has a surface area 10% greater, 20% greater, 30% greater or more than the display panel 14 surface area. In further illustrative embodiments, the backlight button has a surface area of at least 1%, 2.5%, 5%, 7.5%, 10%, 12.5%, 15% or more of the base housing 12 surface area.

The outer ring 12 preferably has an outer area and an inner main circular electronic display, while circular electronic display 20 have a common circular glass or plastic outer covering that can be flat or gently arced in an inward or outward direction.

The outer ring 12 may substantially surround the circular display monitor or substantially surround a portion of the circular display monitor visible to a user. The outer ring 12 is generally coincident with an outer-facing lateral periphery of the housing.

The user interface module of the RWPDNC apparatus 10 is controlled by two types of user input, the first being a rotation of the outer ring 12 and the second being an inward push on the outer ring 12.

The outer ring 12 and the inward pushing of the outer ring is responsive to menus and submenus displayed on the circular display monitor 20, the user interface module is capable of receiving all necessary information from the user for basic setup and operation. The outer ring 16 uses a digital encoder, analogous to stepper motor technology, to measure the rotational movement and final rotational position. The RWPDMC apparatus 10 recognizes three fundamental user inputs by virtue of the ring rotation (1) ring rotating left, (2) ring rotating right, and (3) user acceptance by inward motion.

The RWPDMC user interface module communicates monitoring operations with and controlling functions to remotely located sensors and water control valves of the water parameter collector unit. For example, pushing the outer ring 106 of the user interface module in and holding with inward pressure for an amount of time, such as 2-3 seconds, which can be interpreted as signal to turn on (or off) a remotely located shower. Such rotating and pushing action bring up certain menus and sub-menus that are dividing into categories such as "settings". "programming" and can include functions such as modify a shower, bath or faucet on/off period, modify displayed parameters order or selection, color schemes, Bluetooth, WIFI settings, calibrate with the temperature, water flow and timing sensors, define a hold-out period, modify the display of parameters, or input passwords.

In addition, the user interface module of the RWPDMC apparatus 10, 30 can control a water shut off means to activate or deactivate a shower, bath or faucet water supply if an alarm or setting has been activated. The water shut-off/on mechanism is electrically connected, either by wired or wireless communication means, to the RWPDMC user interface module. The water shut off means can be activated if an alarm state has been achieved, e.g. shower time of 20 minutes and 10 seconds has expired, or temperature is above 115 degrees Fahrenheit, or the total of 25 gallons of water has flowed since the water source was opening. The alarm or settings can be a default setting installed by the manufacturer or programmed by the user on the RWPDMC apparatus 10, 30. Similarly, a cell phone, smart phone, computer or similar apparatus, using local Bluetooth or Wi-Fi, or communicating with a network system and communicating by cellular technology, can communicate with the user interface module or the water parameter collector unit to convey certain information to the user (e.g. shower temperature or specified temperature of shower is reached and shower is ready).

The user interface module can include functionalities such as programs used in remote data storage and data processing centers (sometimes referred to at the "cloud") that receive data communications from and/or that provide command signals to the RWPDMC apparatus 10, 30.

The water parameter collector unit of the RWPDMC apparatus 10, 30 as installed in a house, corporation or institution, an has at least one of a water sensor, timing circuit, temperature sensors, and one or more electronic controlled water control valve connected to a water supply and communicated using a set of data control wires extending therefrom. The RWPDMC 10 is extremely well suited for installation by contractors in new home construction and/or in the context of complete water conservation system replacement. In an alternate means, the RWPDMC apparatus 10, 30 as installed in a house, corporation or institution having at least one of a water sensor, timing circuit and temperature sensor connected to a water supply and communicated using wireless technology.

The temperature, timing and water sensor data that is communicated through a wireless means from the water parameter collector unit uses radio-frequency, Bluetooth, WiFi, optical or other wireless technology for transferring the water parameter data generated by the sensors and collected by the microprocessor and sent to a wireless receiver on the user interface module of the remote water parameter display, monitor and/or control apparatus 10. The water parameter collector unit and user interface module of the water parameter display, monitor and/or control apparatus and/or the sensor apparatus can have the function that allows an individual, user or entity to review that data for auditing or monitoring purposes. This could be useful in commercial operations, such as in hotels, motels, work-out facilities or other commercial operations that allows individuals to use water supplies whereby the wireless transfer means or communication can be sent to a remote receiver that displays or records the water parameters. For example, a particular hotel chain might allow guests to use a certain quantity of water for shower purposes, e.g. 35 gallons per day. Maids or other individuals having access to the individual's room can have a display means 20 that monitors and records the amount water used per day. If the individual uses 40 gallons per day, the hotel chain will have recorded water parameter data to add an additional charge to the individual hotel bill for the additional water usage. Examples of Bluetooth or Wi-Fi modules that can be added to the present invention are the RN-41 Bluetooth modules available from Roving Networks in Los Gatos, Calif., the KC-41, KC 11.4, KC-5100, KC-216 or KC-225 data serial modules from KC Wireless in Tempe AZ, and/or the BT-21 module from Amp'ed RF wireless solutions in San Jose, Calif. Examples of wireless protocols that can be utilized with the present invention include, but are not limited to, the IEEE 802.11a, IEEE 802.11b, IEEE 802.11g and IEEE 802.11n modulation techniques. Applicants recognize that there are numerous wireless protocols that have been developed that, although not specifically listed, could be utilized with the present invention for data transfer purposes.

In addition, the wireless or wire data transfer can be connected to the Internet using the IP or DHCP protocols whereby the data can be monitored remotely over the Internet using a software program designed to record, display, analyze and/or audit the water parameter data. The present invention would probably have to "log on" to a server to report the water parameters or it could respond to queries once its presence is known to the server.

Also some wireless routers support a form of "private" point-to-point or bridging operation which could be used to transfer water parameter data from the present invention to a receiving apparatus. Other kinds of proprietary protocols to be used with the present invention are possible as well. For example, there is the ISM (industrial, scientific and medical) bands. The ISM bands are defined by the ITU-R in 5.138, 5.150, and 5.280 of the Radio Regulations. Individual countries' use of the bands designated in these sections may differ due to variations in national radio regulations. Because communication devices using the ISM bands must tolerate any interference from ISM equipment, these bands are typically given over to uses intended for unlicensed operation, since unlicensed operation typically needs to be tolerant of interference from other devices anyway. In the United States of America, ISM uses of the ISM bands are governed by Part 18 of the FCC rules, while Part 15 Subpart B contains the rules for unlicensed communication devices, even those that use the ISM frequencies. Part 18 ISM rules prohibit using ISM for communications.

The ISM bands defined by the ITU-R are:

| Frequency range [Hz] | Center frequency[Hz] |
| --- | --- |
| 6.765-6.795 MHz | 6.780 MHz |
| 13.553-13.567 MHz | 13.560 MHz |
| 26.957-27.283 MHz | 27.120 MHz |
| 40.66-40.70 MHz | 40.68 MHz |
| 433.05-434.79 MHz | 433.92 MHz |
| 902-928 MHz | 915 MHz |
| 2.400-2.500 GHz | 2.450 GHz |
| 5.725-5.875 GHz | 5.800 GHz |
| 24-24.25 GHz | 24.125 GHz |
| 61-61.5 GHz | 61.25 GHz |
| 122-123 GHz | 122.5 GHz |
| 244-246 GHz | 245 GHz |

While currently the 430 MHz and 900 MHz frequencies are commonly used in the US, it is anticipated by the Applicants that the other frequencies could be used for water parameter transfers.

Another protocol known as CAN or CAN-bus (ISO 11898-1) that was originally designed for automotive applications, but now moving into industrial applications is another type of network that could be used to transfer water parameter data. Devices that are connected by a CAN network are typically sensors, actuators and control devices. A CAN message never reaches these devices directly, but instead a host-processor and a CAN Controller is needed between these devices and the bus.

Some implementations of the RWPDMC apparatus 10, 30 incorporate one or more sensors to gather incidental data from the environment associated with the house, business or institution. Sensors incorporated within RWPDMC apparatus 10 may detect occupancy, room temperature, backlighting and influence the control and operation the RWPDMC apparatus 10, 30.

FIG. 1 also illustrates the presentation of time parameter 22, temperature parameter 24 and flow rate parameter 26 with outer selectable panel areas or soft buttons for menu selection and adjustment on the user interface module. The RWPDMC 10 user interface module can show the current time of day when the sensors of the water parameter collector unit, monitoring the water supply, are not in operation. It is anticipated by the Applicant that a menu selection can be selected to activate a water source such as a shower duration that based on rotation of the outer ring 16. In this exemplary situation, the user interface module of the RWPDMC apparatus 10, 30 can controls features such as a shower, bath or faucet activation and deactivation period. Alternately, prior to the time in which the user has walked up to the user interface module of the RWPDMC apparatus 10, 30, the time parameter of the circular display remains entirely blank (and the backlight is off), which corresponds to a state of inactivity when no person has come near the unit. Once the user walks up to the display, their presence is detected by one or more sensors in the RWPDMC apparatus 10, 30 (e.g., via a motion sensor) at which point the circular display monitor 20 is automatically turned on and timing parameters can be observed and functionality of the apparatus can be accomplished.

When the user selects the shower activation mode using one of the programmable selectable panels or soft buttons 18a, 18b, 18c or 18d, for example, rotating the ring can be begins to increase the shower duration. As the user turns the outer ring clockwise, a digital numerical representation of the increasing value of the duration of the shower is instantaneously provided, and numeric value increases. When the user turns the outer ring in a counter-clockwise a digital numerical representation of the decreasing value of the duration of the shower is instantaneously provided, and numeric value decreases. Thus, a user receives instant feedback about an effect of his rotation and may thus tailor a degree of his ring rotation accordingly. Relationships between ring rotations and selection off menu options may be pre-established. For example, in the setting mode, rotation of the outer ring may select languages settings, different unit formats, etc. In the programming mode, rotation of the outer ring may select allowable shower durations, set temperatures, audible alerts and sound intensities, etc.

When the ring 12 is pushed forward to accept the shower duration value, the remote shower (or other water source) can immediately turn on are can have a programmable lagging period. Also programmable by the owner or advanced user, is the maximum shower duration and the limit of the timing parameter obtained by rotation of the ring will not exceed the programmed shower duration period.

User interactions with the RWPDMC apparatus 10 by virtue of manipulations of the outer ring 12 are analyzed and non-numeric indicators (e.g., related to water use and water parameters). In the exemplary method, the water activation duration is currently set to a value known to be within a first range known to be good or appropriate for water conservation, a pleasing positive-reinforcement icon such as the blue waterfall (with plenty of flowing water) or a green light, or the like, is displayed. As the user turns up the time, the blue waterfall or green light continues to be displayed as long as the duration remains in that first range. However, as the user continues to turn up the time duration to a value greater than the first range and into a second range, there is displayed a negatively reinforcing icon concern, or other somewhat negative emotion, such icon being, for example, the blue waterfall has less water or a yellow/red light. It is desired that the many users will respond to the negatively reinforcing icon by turning the water duration back down, if the user returns the duration value in the first range, they are "rewarded" by the return of the blue waterfall (with plenty of flowing water). Many other types of positive-emotion icons or displays can be used in place of the blue waterfall or green light, and likewise many different negatively reinforcing icons or displays can be used in place of the flashing yellow/red light (a water pond become partially drained, an hourglass that shows less water available), while remaining within the scope of the present teachings.

The RWPDNC apparatus 10, 30 can be programmed to be entirely silent unless a user has walked up and begun controlling the unit. In this mode, battery power use is minimized and It can be programmed such that there are no clicking-type annoyances when the temperature settings, water durations or other features are activated. Via the single outer ring 12, a user may easily be able to perform multiple types of menu and submenu interactions with RWPDMC apparatus 10. A selection component 12 and electronic display 20 may enable a user to, e.g.: (1) identify a type of water parameter, password, or other variable to be set, features to be performed; and/or (2) identify a value for one or more variables and/or for one or more information fields from water parameter sensors.

For example, the RWPDMC apparatus 10, 30 may include a plurality of variable categories (e.g., schedule, password and other settings, languages, wireless water and temperature sensor calibration pairing modes, colors displayed, background colors, programming features e.g. shower duration period, shower "hold out" period. Leak detection notice, input cell phone numbers, IP address and programming). As described in greater detail below, display 20 may be configured to present a circular menu: as the user rotates outer ring 16, a different category may appear at or near a top of the display. A user may select a particular type of category by clicking outer ring 16. Selection of some categories allows a user to view available sub-menus. For example, rotation of outer ring 16 may cause an apparent translation of the entire screen, such that a first sub-menu moves off of the screen as a second sub-menu moves onto the screen. In some instances, the user may be able to instantly interact with the displayed sub-menu even without clicking ring 16.

Each variable and/or information filed may be defined by a computer instruction value. The computer instruction value may include, e.g. a numeric value (e.g. a shower duration variable is set at "7 minutes"). A word (e.g. a password is set as "Password"), a letter (e.g. a water sensor 1 is identified as WSensor "1"), a selection amongst a plurality of options (e.g. smart learning is "Enabled"). An active computer instruction variable/field may be identified based on the user' selection of a custom variable/field, a default variable/field, and/or other information.

Various value options may then be presented to the user. For example, a list of options may be presented in a grid-like fashion on the display, and a user may move a highlighted option by rotating outer ring 12. As another example, alphanumeric characteristics may be arcuately presented around an outer border of circular electronic display 20. In some embodiments, the options are indicatively presented (e.g., by presenting a series of tick marks, representing options of evenly spaced values), and one or more options (e.g., a highlighted option) may be expressly presented (e.g., by displaying a value of the highlighted option at or near a center of the display). A user may rotate outer ring 12 until a desired option is highlighted. When a selection is highlighted, the selection may be confirmed by an inward click input on the outer ring 106.

As example screens of an interactive RWPDMC apparatus 10 menu system include a rotatable main menu, according to some preferred embodiments. As described in further detail below, the menu system may be accessible to a user by an inward pressing of ring 16, and the user may be able to navigate through the menu system by virtue of series of rotations and inward clicks of the outer ring 16. The screens shown, according to some embodiments, are displayed on the circular display monitor 20. FIG. 1 shows an example screen in normal operations with selectable outer rim selectable panel areas or soft buttons 18a, 18b, 18c and 18d. A rotation of the ring 12 the highlights one of the soft button and then an inward click from the normal display screen causes a circumferential menu to appear. In this example the main menu displays around the perimeter of the circular display area various menu names such as "SETTINGS," "PROGRAM" " " "XXXX"s well one or more icons. Once one of the main soft buttons is selected, the top of the circular menu includes an active window that shows the user which menu item will be selected if an inward click is performed at that time. Window is highlighted, filled in, circumscribed, or otherwise marked such that a user can easily identify that a menu item within this window is active.

Upon user rotation of the rotatable ring 12, the menu items turn clockwise or counter clockwise, matching the direction of the rotatable ring 12, so as to allow different menu items to be selected. Examples displayed in response to a clockwise rotation of the rotatable ring 12 are modify a shower, bath or faucet on/off period, modify displayed parameters order or selection, color schemes, Bluetooth, WIFI settings, calibrate with the temperature, water flow and timing sensors, define a hold-out period, modify the display of parameters, or input passwords. From this screen, if an inward click is performed by the user, then the Settings menu is entered. It has been found that a circular rotating menu such as shown, when combined with a rotatable ring and round display area, allows for highly intuitive and easy input, and so therefore greatly enhances the user interface experience for many users.

Menu items may include text (e.g., "Program") and/or selected icons. The example screen then allows for the Program mode to be entered. If in inward click is performed, a menu or submenu screen appears The user can view the current mode (and select an numerical value or graphical icon whereby it becomes marked with a check mark). Another way in which rotatable ring 16 may be used is to make a selection. A plurality of selection options may be presented, with one or more options being emphasized (e.g., highlighted). A user may highlight a different option by rotating rotatable ring 12. Once the user is satisfied that the desired option is highlighted, they may push forward on the ring or the circular display monitor 20 to confirm the selection. Thus, a user may rotate rotatable ring 12 clockwise (or counter-clockwise) to move the highlighting from "SETTING" to "PROGRAM" or "XXXXX" The user may then establish the selection by clicking the ring 12 or circular display monitor 20, and thereby change the mode. If "SETTING" is selected, then additional menus or sub-menus with different selections will display. Examples for settings for electronic screen brightness of backlighting, auto-brightness, different language settings, temperature units, passive infrared motion sensor (PIR) setting, etc.

For one embodiment, the RWPDMC apparatus 10 is programmed to provide a software lockout functionality, wherein a person is required to enter a password or combination before the RWPDMC apparatus 10 will accept their control inputs. The software lockout functionality can be highly useful, for example, for Mom and Dad in preventing their teenager from making unwanted changes to the shower duration and "hold out" periods, for various landlord-tenant scenarios, and in a variety of other situations.

The front face of the RWPDNC apparatus 10 comprises a clear cover that according to some embodiments is polycarbonate or glass, and a metallic portion preferably having a number of slots formed therein as shown. The surface of circular display monitor 20, cover, and metallic portion form a common outward arc or spherical shape gently arcing outward, and this gentle arcing shape is continued by the outer ring. The central electronic display is a dot-matrix layout LCD, LED or OMLED or other display technology such that custom shapes can be generated, rather than being a segmented layout. According to some embodiments, a combination of dot-matrix layout and segmented layout is employed. According to some embodiments, central display 816 is a backlit color liquid crystal display (LCD or LED).

A portion of the electric display 20, 30 can have one or more openings to facilitate the use of a passive infrared motion sensor.

The RWPDNC apparatus 10 is generally constructed such that the electronic display 20 is at a fixed orientation and does not rotate with the outer ring 12, so that the electronic display 20 remains easily read by the user. For some embodiments, the cover and metallic portion also remain at a fixed orientation and do not rotate with the outer ring 12. The RWPDMC apparatus 10 can have a LED indicator used to display blinking red when a rechargeable battery of the display device is very low needs to being recharged. More generally, the LED indicator can be used for communicating one or more status codes or error codes by virtue of red color, green color, various combinations of red and green, various different blinking rates, and so forth, which can be useful for troubleshooting purposes.

Motion sensing can be use used in the detection and/or predict of occupancy. According to some embodiments, occupancy information is used in generating an effective and efficient scheduled program. A PIR sensor can be provided to detect an approaching user. The PIR can function as a proximity sensor that can be used to detect proximity in the range of about 2-3 feet so that the RWPDNC apparatus 10, 30 can initiate a "waking up" sequence when the user is approaching. Such use of proximity sensing PIR is useful for enhancing the user experience by being "ready" for interaction when the user is ready to interact with the device while, at the same time, saving battery power when the home, business or institution is unoccupied.

According to some embodiments, the user interface module of the RWPDMC apparatus 10, 30 includes a programmable CPU/microprocessor/microcontroller, electrical circuitry with a display driver and a wireless communications system. The user interface module of the RWPDMC apparatus 10 is specifically designed to communication with the at least one of the timing, temperature and flow sensors of the water parameter collector unit. The programmable microprocessor, electrical circuitry with a display driver and a wireless communications system may be disposed within a housing of the user interface module of the RWPDMC apparatus 10. The programmable CPU/microprocessor/microcontroller and electrical circuitry are configured to dynamically identify user input via rotatable ring 16, dynamically identifying a variable value, and/or dynamically identify the user interface module and water parameter collector unit. The programmable CPU/microprocessor/microcontroller and electrical circuitry are configured and programmed to provide an interactive menu selections on the electronic display area 29 and responsive to an inward pressing of rotatable ring 16 and/or to provide user navigation within the interactive menu system based on rotation of rotatable ring 16 and inward pressing of rotatable ring or circular display monitor 20. The programmable CPU/microprocessor/microcontroller and electrical circuitry are designed to cause the display driver and display area to display information to the user and/or to receive user input through rotation and inward pushing of the ring 16. The displayed value may be, e.g., numeric, textual or graphical.

The programmable CPU/microprocessor/microcontroller and electrical circuitry may further set a variable value in accordance with a user selection. For example, a particular type of user input (e.g., inwards pressure exertion) may be detected. A value of a selected variable may be determined based on, e.g., a prior ring rotation, displayed variable value, etc. The variable may then be set to this value. The programmable CPU/microprocessor/microcontroller and electrical circuitry, according to some embodiments, is capable of controlling an operation of remote water control mechanism. The programmable microprocessor and electrical circuitry are further programmed and configured to carry out other operations as described further and/or in other ones of the commonly assigned incorporated applications. For example, programmable CPU/microprocessor/microcontroller, electrical circuitry with a display driver and a wireless communication is further programmed and configured to maintain and update microprocessor software for the communicating with one or more remote water flow rate sensors, temperature sensor and timing circuits.

According to some embodiments, the wireless communications is used to communicate with devices such as personal computers and/or other water conservation system components, which can be peer-to-peer communications, communications through one or more servers located on a private network, and/or communications through a cloud-based service.

It is anticipated that the RWPDMC apparatus 10, 30 is powered by a rechargeable Lithium-Ion battery, which for one preferred embodiment has a nominal range voltage of 3.0-14 volts DC and a nominal capacity in the range of 500 to 2000 mAh. To extend battery life, however, the battery charging circuitry may not fully charge the battery. Also included is an optical finger navigation module that is configured and positioned to sense rotation of the outer ring 16. The module uses methods analogous to the operation of optical computer mice to sense the movement of a texturable or knobbed surface on a facing periphery of the outer ring 12.

A circumferentially positioned framework member is designed over the Fresnel lens and an associated PIR motion sensor concealing and protecting these PIR sensing elements, while horizontal slots in the grille member allow the PIR motion sensing hardware, despite being concealed, to detect the motion of an user in the shower area. The PIR motion sensor may detect occupants moving laterally due to the shape of openings, which are slit-like and elongated along a substantially horizontal direction. In some implementations, the Fresnel lens helps focus the radiation from these occupants onto the infrared sensitive sensor elements of the PIR motion sensor. For example, the framework member has one or more openings placed over the radiation receiving elements and Fresnel lens of the PIR motion sensor. While framework member may be constructed from a variety of materials including metal, plastic, glass, carbon-composite, and metallic alloy, it is generally preferable for purposes of increased temperature sensing precision (PIR sensor) for the framework member to be made of a material with a high thermal conductivity, such as a metal or metallic alloy.

As an example for the CPU/microprocessor/microcontroller microprocessor, electrical circuitry with a display driver and a wireless communications for RWPDMC apparatus 10, 30 includes the Texas Instruments family of low power chips and an associated oscillator, along with DDR SDRAM memory, and mass NAND storage or the processor/microcontroller. As only one example is a Texas Instruments MSP430F System-on-Chip Microcontroller. For the Wi-Fi capability, there is provided in a separate compartment of RF shielding a Wi-Fi module, which is based on the Texas Instruments MSP430F chipset supporting the 802.11 b/g/n WLAN standard. For ZigBee capability, there is provided also in a separately shielded RF compartment a ZigBee module, which can be, for example, a C2530F256 module from Texas Instruments. For the ZigBee module there is provided supporting circuitry including an oscillator and a low-noise amplifier. Also provided is display backlight voltage conversion circuitry, piezoelectric driving circuitry 1424, and power management circuitry 1426 (local power rails, etc.). Provided on the electrical circuit that attaches proximity to be exposed to ambient light is the Silicon Labs SI1142 Proximity/Ambient Light Sensor with an I2C Interface. Also provided is optional rechargeable battery with charging-electrical circuitry, and RF antennas.

The RWPDMC apparatus 10, 30 can use the relatively powerful and relatively power-intensive Texas Instruments AM3703 Sitara Processor that has ARM cortex-A8 microprocessor that is capable of quickly performing more complex functions such as driving the user interface display and performing various mathematical learning computations. If battery power must be conserved that the relatively less powerful and less power-intensive Texas Instruments MSP430 microcontroller for performing lees fewer intensive tasks, such driving and controlling the water flow rate sensor, the temperature sensor, the timing circuit and if applicable, the occupancy sensors. There are hundreds of variants but for an example, the MSP430F436IPN (80 pin package) or MSP430F436IPZ (100 pin package) could be utilized in the present invention. There are many other variants or other microprocessors, whether commercially marketed or privately fabricated, that can be used with the present invention.

To conserve limited batter power but still provide the extensive power needed for certain operations, the two example microprocessors can be employed to perform separate functions and support each other for specific operations. The example relatively powerful and relatively power-intensive Texas Instruments AM3703 microprocessor can be maintained in a "sleep" state for extended periods of time and is "woken up" only for occasions in which its capabilities are needed, whereas the example relatively less powerful and less power-intensive Texas Instruments MSP430 can be kept on more or less continuously and slowing down mode for brief periodic intervals to conserve power to perform its relatively low-power tasks. The example Texas Instruments AM3703 microprocessor and the example Texas Instruments MSP430 microcontroller are mutually configured such that the example Texas Instruments MSP430 microcontroller processor can "wake" the example Texas Instruments AM3703 microprocessor on the occurrence of certain events. For example, a PIR wake up operation can be provided by which the example Texas Instruments MSP430 microcontroller detects a user's hand or body approaching the user interface module. The excited PIR will "wake up" the example Texas Instruments AM3703 microprocessor so that it can turn on and control the electronic display 20, 34 and be ready to respond more rapidly when their hand touches the dial.

In the two microprocessor embodiment, the operations that the example relatively powerful and relatively power-intensive Texas Instruments AM3703 microprocessor will be conducting are the core water parameter display and monitor operations, controlling the user interface for LCD/LED display and audio transducer, and processing the ring 12 rotation and associated operations, power management and battery control circuitry, schedule and learning management activities, sensor database, objects, global objects, building characteristics, cloud management interface, conservation encouragement activities, WiFi, Zigbee and Bluetooth wireless communications, and include circuitry to communication with the example Texas Instruments MSP430 microcontroller.

The microprocessors can include an EEPROM or any type of memory section that allows for specific programming to be incorporated as processing instructions. Furthermore, the microprocessor may have the capability to convert analog signals into digital information for decoding and processing. Another example of a microprocessor that could be used for the CPU or microprocessor is the PIC16F876 28-pin 8-Bin CMOS FLASH micro-controllers manufactured by Microchip Technology, Inc. This particular microprocessor has a 128K EEPROM Data memory bank for flash memory of specific instructions and utilizes a 35-word instruction set. It also has five 10-bit Analog-to-Digital Inputs that can provide the means for converting the information obtained from the temperature sensor, flow sensor, and/or timing circuit from its analog format into a digitized form for processing by the instruction sets of the CPU or microprocessor In the two microprocessor embodiment, the operations that the example relatively less powerful and less power-intensive Texas Instruments MSP430 will be conducting are remote sensor (water flow sensor, temperature sensor and timing data) polling interface, sensor database, LED indication light control, command interpreter and include circuitry to communicate with the example Texas Instruments AM3703 microprocessor.

Now specifically referring to FIG. 2 which demonstrates a perspective view of the second embodiment comprising an adaptable remote display, monitor and/or control apparatus (RWPDMC) with a touch-screen display in a round, square, rectangle or other configuration utilizing LED, LCD, OMLED or other display technology that has a menu system and a plurality of soft buttons and including rear surface attachment means of a housing that includes with electrical circuitry and one or more microprocessors/microcontrollers, and designed to communicate by wired or wireless technology to a remotely located water flow sensor, temperature sensor and timing circuit attached to or in close proximity to a water supply. The remote water parameter display and control apparatus 30, illustratively a wall-mounted display, includes a base housing 32, a front surface including an electronic touch-screen display 34 exhibiting a time parameter 36, a temperature parameter 37 and a flow sensor 38, and having one or more user selectable panels or soft buttons 40a, 40, b, 40c, 40d. In an illustrative embodiment, the display panel 34 and a backlight button from a portion of the front surface. The backlight button can be located in any useable location and assume any suitable configuration relative to one another, as desired. The base housing 32, touch-screen display 34 and interfacing members 40a, 40b, 40c, 40d form an outer housing for the RWPDMC 30. The RWPDMC 30 is shown having a rectangle form, however, the RWPDMC 30 can have any useable regular or irregular form such as, for example, square, circular, oblong, triangular, or any other form, as desired.

The base housing is defined by a base housing perimeter. In an illustrative embodiment, the base housing is engaged to various mounting surfaces but various technology means, e.g. suction, adhesive, Velcro, screw and bolting technology, etc. (not shown). The rear base housing has a rear base housing surface area defined by the base housing perimeter. As used herein, the term "surface area" is defined as a planar cross-sectional surface area. However, it should be recognized that the surface area of the base housing can have any desired size to provide adequate attachment means.

In the illustrative embodiment, the touch-screen display 34 is defined central area illustrated showing the time or cumulative time 36, the temperature 37 and water flow rate 38. The central display is defined also by a selectable display panels or soft panels 40a, 40b, 40c and 40d located on the periphery. The selectable display panels or soft buttons 40a, 40b, 40c, 40d can have any useable regular or irregular shape, as desired. The display panel 40a, 40b, 40c and 40d has a display panel surface area within the display panel perimeter. However, it should be recognized that the surface area of the display panel 18a, 18b, 18c and 18d can have any desired size. In addition, it anticipated by the Applicant that the display panels can be one, two, three, four, five, six or more and each display panel is selectable such that a number of selections are presented on the LCD/LED display, or that subsequent specific menu are presented on the LCD/LED display.

A separate display retainer and switchable backlight disposed behind the touch-screen display 34 may be used to illuminate touch-screen display 34 and the selectable display panels 40a, 40b, 40c and 40d at times when visibility is compromised e.g. night, and to increase the visibility of the display panel during daytime use. A backlight button may be used to operably activate and/or deactivate the switchable backlight. Alternatively, or in addition, the switchable backlight can be activated by moving the interface member 16 when displaying and/or adjusting a display parameter. The switchable backlight can deactivate following the expiration of a specific time interval.

The user interface module can have a backlight button (not shown) that is generally co-planar with the housing or front surface 20 and form a portion of the outer housing or front surface. Preferably motion sensing by a PIR can be use used in the detection and/or predict of occupancy. The The PIR can function as a proximity sensor that can be used to detect proximity in the range of about 2-3 feet so that the RWPDMC apparatus 10, 30 can initiate a "waking up" sequence when the user is approaching. Such use of proximity sensing is useful for enhancing the user experience by being "ready" for interaction when the user is ready to interact with the device while, at the same time, saving battery power when the home, business or institution is unoccupied.

The user interface module can have a typical LCD, LED, OLED electric screen with various manual push-button switch or alternately has a touch-screen (buttons) display member 34 that is shown having an annular shape However, the interface display member 34 can have any useable regular or irregular shape as desired. In the illustrative embodiment, the interface touch-screen display member 34 forms the portion of the outer housing between the base housing and the front surface. The user interface module touch-screen display member 34 is defined by standard LCD/LED touch-screen technology.

The user interface module touch-screen display member 34 is configured to modify the information displayed on the display panel. For example, and in one illustrative embodiment, the interface display touch-screen display 34 may display the value of a parameter of the controller 30, such as time, temperature, one or more set points, or any other suitable parameter. The interface touch-screen display member 34 can have a icon for display sub-menu and then be stated to effect a change in the parameter on the display panel. In another illustrative embodiment, the interface touch-screen display panel can initially display information regarding a first parameter such as, for example, a time or a temperature. Upon movement or selection of a panel or soft button on the interface member, the touch-screen display panel can display information regarding a second parameter such as, for example, a time or temperature set point. The interface touch-screen display member 34 can then be further moved to effect a change in the second parameter. For example, the interface member can be moved in a first direction to increase the value of the displayed second parameter or be moved in a second direction opposite the first direction to decrease the value of the displayed second parameter. In an illustrative embodiment, the interface touch-screen display member 34 has an annular or circular form and the movement is a rotational movement. However, in other embodiments, the interface member may be moved along an elliptical, linear or along any other desired path, as desired. Menus and submenus can be selected for different programming or features by selecting various display panels or soft buttons.

The interface touch-screen display member 34 can be removable from the remote water parameter display and control apparatus 30, if desired. Removal of the interface member 16 by a user aids in cleaning the remote water parameter display and control apparatus 30 and interface display member 34. In addition, with the interface member 16 removed the controller 30 still can fulfill all the requirements for environmental water and moisture protection. The interface touch-screen display member 34 can be formed of a water proof or water resistant material.

A base housing 32 may be provided. The base housing 32 may be mounted to a mounting surface such as a standard or shower wall. A front section, which is generally shown at, is disposed on to the base housing 32, and in some embodiments, a connector may provide one or more signal connections between the base housing 32 and the front section.

The remote water parameter display and control apparatus section include electronics useful for the operation of the controller 30. The controller section 50 includes a main circuit board 51. A display panel 34 may be attached to the main circuit board 51 via a display retainer housing, as further described below. One or more switches can also be disposed on or adjacent to the main circuit board. The one or more switches may be electrically connected to electronics on the main circuit board, and may form the basis for adjusting one or more control parameters of the remote water parameter display and control apparatus. The switches can be mechanical switches, optical switches, microswitches or any other suitable switch type, as desired. The backlight switch can also be disposed on or adjacent to the main circuit board.

A remote water parameter collector unit which has at least one of a water flow rate sensor, temperature sensor, time circuit, one or more control valves, are to be electrically coupled with the main circuit board having a CPU and electrical circuitry with wired or preferably wireless technology. It is anticipated that in certain circumstances, standard wire techniques can couple the sensors to the circuit board with electrical circuitry. The sensors and one or more control valves are in close proximity to or coupled/connected to a water supply source to achieving the sensors desired function to acquire accurate readings and control water flow. The sensors and one or more control valves will include a circuit board with electrical circuitry which facilitates the communication of water parameter data to the remote water parameter display and control apparatus.

An intermediate section can be disposed between the front section and the base housing. The intermediate section can form at least part of the front surface of the remote water parameter display and control apparatus. The intermediate housing may also include one or more detent tabs. The detent tabs and can be formed from metal, hard plastic, or any other suitable material. The detent tabs can be configured to engage corresponding outer and inner detent rings, respectively, of a detent ring housing. The detent tabs may move toward the back base housing 32 when engaging a peak of a detent along the detent ring housing, and away from the back housing when engaging a valley of a detent along the detent ring housing.

The interface touch-screen display member 34 can form a portion of the outer housing or face surface of the housing of the user interface module 30. The user interface module touch-screen display member 34 can have an interface inner perimeter and an interface outer perimeter. The grooved mating surface can be disposed on or in the inner surface of the interface touch-screen display member 34 and may be adapted to engage the interlock surface of the detent ring housing. The interface touch-screen display member 34 can be rotated by a user of the controller 30. When rotated, the interface touch-screen display member 34 moves the detent ring housing relative to the detent tabs and of the intermediate housing.

Many of the features, technology and operation aspects of the embodiment shown in FIG. 1 can be applicable to, and are incorporated within, the embodiment shown in FIG. 2.

While this invention has been described as having a preferred design, the present invention can be further modified within the spirit and scope of this disclosure. The application is therefore intended to cover any variations, uses, or adaptations of the invention using its general principles. Further, this application is intended to cover such departures from the present disclosure as come within known or customary practice and the art to which this invention pertains and which fall within the limits of the appended claims.

The invention claimed is:

1. A water parameter display, monitor and control system comprising:
   a user interface module having a housing with an electronic display disposed thereon, said housing containing at least one of a CPU, microprocessor, and microcontroller, electronic circuitry and a power supply disposed within said user interface module, said electrical circuitry including wireless technology;
   said wireless technology includes at least one of Wi-Fi, Bluetooth, Zigbee, cellular and network technology;
   said user interface module having at least one of a rotational input motion mechanism, one or more hard buttons, and one or more soft buttons exhibited on said electronic display, whereby said one or more soft buttons are activated using touch screen technology on the electronic display, said at least one of a rotational input motion mechanism, one or more hard buttons, or one or more soft buttons communicated with at least one of the CPU, microprocessor and microcontroller, and electronic circuitry system being further configured to present one or more options on one or more menu pages;
   said user interface module having program instructions to exhibit at least one of a water flow rate, temperature and timing parameters;
   a water parameter collector unit having at least one of a water flow rate sensor and a temperature sensor in close proximity or coupled to a water supply line;
   said water parameter collector unit including one or more control valves;
   said user interface module located remotely from said water parameter collection unit, said user interface module communicates by wired data cable or wireless technology to said water parameter collection unit;
   said water parameter collector unit transfers at least one of a water rate flow, temperature or timing parameter on said electronic display of said user interface module;
   said user interface module can communicate one or more command signals to said user interface module or to said water parameter collection unit; and
   said at least one of Wi-Fi, Bluetooth, Zigbee and cellular technology can communicate between said user interface module or said water parameter collector unit, and a cell phone or smart phone, computer or other electronic apparatus.

2. A water parameter display, monitor and control system as recited in claim 1, wherein said command turns on or off the water supply.

3. A water parameter display, monitor and control system as recited in claim 1, wherein said command controls the temperature of water.

4. A water parameter display, monitor and control system as recited in claim 1, wherein said wireless technology can communicate between the user interface module or water parameter collecting unit to a cell phone, smart phone, computer or other electronic apparatus by using a network system connected with remote computers providing cloud-based services.

5. A water parameter display, monitor and control system as recited in claim 1, wherein said water parameter displayed in a graphical or numerical format that can be exhibited on the electronic display.

6. A water parameter display, monitor and control system as recited in claim 1, wherein said electronic display is substantially square, rectangular, or circular in shape.

7. A water parameter display, monitor and control system as recited in claim 1, wherein said user interface housing has a portion that is adaptable to affix or adhere to various surfaces, said surfaces is selected from a group consisting of a glass surface, a wall surface, a mirror surface, wood beam, a metal surface, a plastic surface, a ceramic surface, a tile surface, a panel surface, a wall paper surface, or any combinations thereof.

8. A water parameter display, monitor and control system as recited in claim 7, where said portion is affixed by one or more screws, nails or other attachment technology, adhesive, ore glue or other adhesive technology, or hook and loop technology.

9. A water parameter display, monitor and control system as recited in claim 1, wherein a PIR or motion sensor can be used to wake up the user interface electrical circuitry when a user is in the shower area.

10. A water parameter display, monitor and control system as recited in claim 1, wherein the apparatus can include a LCD, LED, OMLED, gas plasma, fluorescence, incandescent, halogen, or halide lighting technology to show the battery status, communicating one or more status codes, presenting menus and sub-menus and for troubleshooting purposes.

11. A water parameter display, monitor and control system as recited in claim 1, has one or more menus for setting up the enablement or disablement of the ambient light, sensor detection strength, changing units formats, changing languages, setting up communication with said cell phone, smart phone, computer, or other electronic apparatus, light sensitivity and viewing angle of the user interface electronic display.

12. A water parameter display, monitor and control system as recited in claim 1, wherein said one or more menu pages are directed toward a program mode.

13. A water parameter display, monitor and control system as recited in claim 1, wherein said or more menu pages are directed toward a setting mode.

14. A water parameter display, monitor and control system as recited in claim 1, wherein at least one menu is directed towards a calibration wireless pairing mode that connects said water parameter display, monitor and control user interface with said water parameter collection system.

15. A water parameter display, monitor and control system as recited in claim 1, has one or more menus for electronic screen brightness, auto-brightness, PIR setting, click sounds on and off, Celsius or Fahrenheit units, and language selection.

16. A water parameter display, monitor and control system as recited in claim 1, wherein said user interface can be in wireless communication with said cell phone or smart phone, computer or other electronic apparatus.

17. A water parameter display, monitor and control system as recited in claim 1, wherein water parameter collection unit can be in wireless communication with said cell phone or smart phone, computer or other electronic apparatus.

18. A water parameter display, monitor and control system as recited in claim 1, wherein a notification can be sent to said electronic display or said cell phone that the shower is at the set temperature.

* * * * *